United States Patent
Butler et al.

(10) Patent No.: US 11,497,990 B2
(45) Date of Patent: *Nov. 15, 2022

(54) CROWD SOURCED CLOUD GAMING USING PEER-TO-PEER STREAMING

(71) Applicant: Sony Interactive Entertainment LLC, San Mateo, CA (US)

(72) Inventors: Dylan Butler, San Mateo, CA (US); Kyle Cannon, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/907,243

(22) Filed: Jun. 21, 2020

(65) Prior Publication Data
US 2020/0316464 A1    Oct. 8, 2020

Related U.S. Application Data

(63) Continuation of application No. 16/181,128, filed on Nov. 5, 2018, now Pat. No. 10,688,390.

(51) Int. Cl.
A63F 13/34    (2014.01)
A63F 13/352    (2014.01)
A63F 13/40    (2014.01)

(52) U.S. Cl.
CPC ............ *A63F 13/34* (2014.09); *A63F 13/352* (2014.09); *A63F 13/40* (2014.09)

(58) Field of Classification Search
CPC ......... A63F 13/34; A63F 13/352; A63F 13/40
See application file for complete search history.

(56) References Cited

U.S. PATENT DOCUMENTS 10,751,631 B2    8/2020    Bamba
2008/0139301 A1   6/2008    Hothe
(Continued)

FOREIGN PATENT DOCUMENTS

EP    2745893 A2    6/2014
EP    3335774 A1    6/2018

OTHER PUBLICATIONS

International Search Report and Written Opinion (Forms PCT/ISA/220-210-237), dated Dec. 9, 2019, issued in corresponding International Application No. PCT/US2019/050667 (14 total pages).
(Continued)

*Primary Examiner* — Corbett B Coburn
(74) *Attorney, Agent, or Firm* — Penilla IP, APC

(57) ABSTRACT

A method, including: executing, by a cloud gaming machine, a session of a cloud video game, the session configured to generate gameplay video; streaming the gameplay video from the cloud gaming machine over a network to a primary user device; wherein the primary user device is configured to stream the gameplay video over a peer-to-peer network to one or more secondary user devices; receiving, over the network from the primary user device by the cloud gaming machine, primary inputs; receiving, over the network from the one or more secondary devices by the cloud gaming machine, secondary inputs; processing, by the cloud gaming machine, the primary inputs and the secondary inputs to generate aggregated inputs; wherein executing the session of the cloud video game includes applying the aggregated inputs to update a game state of the cloud video game that is processed to generate the gameplay video.

20 Claims, 10 Drawing Sheets

(56) References Cited

U.S. PATENT DOCUMENTS

| | | |
|---|---|---|
| 2009/0128567 A1 | 5/2009 | Shuster et al. |
| 2012/0184373 A1 | 7/2012 | Kim et al. |
| 2013/0137511 A1 | 5/2013 | Bae et al. |
| 2014/0094302 A1 | 4/2014 | Wilkiewicz et al. |
| 2015/0217199 A1 | 8/2015 | Cotter |
| 2015/0331813 A1 | 11/2015 | Perrin et al. |
| 2017/0171614 A1 | 6/2017 | el Kaliouby et al. |
| 2017/0282075 A1 | 10/2017 | Michot et al. |
| 2017/0354878 A1 | 12/2017 | Posin |
| 2017/0373870 A1 | 12/2017 | Hrustanovic et al. |
| 2018/0028912 A1 | 2/2018 | Campbell |
| 2018/0210955 A1 | 7/2018 | Crabtree et al. |
| 2018/0234496 A1 | 8/2018 | Ratias |
| 2018/0250600 A1 | 9/2018 | Trombetta et al. |
| 2018/0353865 A1 | 12/2018 | Bamba |
| 2019/0282897 A1 | 9/2019 | Posin |
| 2019/0366210 A1* | 12/2019 | Beltran ................. A63F 13/335 |

OTHER PUBLICATIONS

App. No. JP 2021-524056, Notification of Reason(s) for Refusal, English translation, Dispatch No. 415983, Ref. No. F011-0085, dated Aug. 23, 2022.

* cited by examiner

CROWD SOURCED CLOUD GAMING USING PEER-TO-PEER STREAMING

BACKGROUND

Field of the Disclosure

The present disclosure relates to systems and methods for crowd-sourced cloud gaming, and more specifically to establishment of peer-to-peer video streaming to enable decentralized gaming mediated through a primary client device of a cloud video game.

Description of the Related Art

A current area of rapidly growing technology is the field of cloud gaming. Users are able to access a number of games on a cloud gaming site over a network, such as the Internet, and begin interaction/playing the game. In order to select a game for game play, a user accesses his/her account on the cloud gaming site, and initiates one of a plurality of games that are available to the user account for game play. The video generated from the cloud video game is transported to a client device. One example of a cloud gaming system is the Playstation® Now cloud gaming service.

It is within this context that embodiments of the disclosure arise.

SUMMARY OF THE DISCLOSURE

Implementations of the present disclosure provide methods and systems that are used to provide crowd-sourced cloud gaming using peer-to-peer streaming.

In accordance with implementations of the disclosure, WebRTC, a streaming technology which can be built into a browser, can be used to allow peering of a video stream (including video image data and audio data). The host can broadcast video to another user, and that user can share the video to another user, etc. There are a number of ways that WebRTC can enable distribution of video efficiently. In accordance with implementations of the disclosure, such streaming can be applied to video game stream that is received through a browser. There can be a plurality of devices connected to the initial streamer of the video game that is connected to the cloud game machine from which the video is streamed. Their video stream is thus cloned to other users, so those spectators can view and hear the initial user's game stream.

One advantage of WebRTC, is that it is very graceful in its video degradation. With some streaming services, if one is not located proximate to one of their servers, then connection and video quality can be degraded because of latency. But with a WebRTC P2P network, the video sharing dynamically downsamples, and gives broader reach of network because a given user device can connect to another device that is nearer to a data center, and the P2P connections are direct and avoid multiple hops to the extent possible.

Further, it is possible to provide a socket back up to the initial user, so that input from a spectator can be received and used to control (at least partially) the gameplay. In some implementations, the users' input is collectively tallied and applied to the video game. Spectators can issue input commands through their respective controllers, and those input commands can be aggregated either on the host user's machine or upstream on the game machine. All the input commands are being fed through the main user's machine back up to the game machine in the cloud. By doing this, it is possible to have a massive multi-player online gaming experience, without placing additional resource burdens on the cloud gaming provider. Further, it is possible to provide real-time spectating and input control from the various users. Though there can be many users, the game machine can treat them as a single player, as their collective input is sent up through the appropriate channel. For example, in some implementations, all users may be engaged in controlling the same character as the primary main user. From the cloud gaming server standpoint, it is seamless, because the collective input appears as a single client, and there are no changes to the session. Thus, the crowd-sourced gameplay functionality can be transparent to the data center hosting system.

Prior attempts at crowd-sourced gaming have been implemented on slow gameplay video games (e.g. turn-based games), such as by having users comment on what to do next, and then tallying up votes, and then issuing the most popular command. However, such a setup does not enable crowd-sourced gameplay of games that require real-time control to be effectively played. In contrast to such prior attempts at crowd-sourced gaming, implementations in accordance with the present disclosure enable real-time crowd-sourced gameplay control, without requiring additional cloud server resources.

It will be appreciated that implementations of the present disclosure enable a collaborative gaming experience, such that others may join a game session, takeover for a minute, help out, etc.

Broadly speaking, some implementations of the present disclosure are drawn to a gaming client inside modern web browsers. Such a browser client can be built using WebRTC technology, which is a well-supported technology that functions similarly over all the major browsers. WebRTC differs from TCP transport in that error checking or packet guarantees are not performed. Similar to a UDP transport, WebRTC is fast by sending/receiving packets with little/no overhead.

Implementations of the present disclosure can use WebRTC to create a peer-to-peer connection which is a direct connection between two clients. The peer-to-peer connection allows the connection to avoid multiple hops and impact latency. Connection initiation can be performed using Session Description Protocol (SDP). SDP is used to create a communication contract between two devices, and supports several options for the control of buffering, key frame definitions, fallback ports, protocols, etc.

In some implementations, a method is provided, including: executing, by a cloud gaming machine, a session of a cloud video game, the session configured to generate gameplay video; streaming the gameplay video from the cloud gaming machine over a network to a primary user device, the primary user device configured to render the gameplay video to a primary display; wherein the primary user device is configured to stream the gameplay video over a peer-to-peer network to one or more secondary user devices, each of said secondary user devices being configured to render the gameplay video, respectively, to one or more secondary displays; wherein the primary user device is configured to process primary inputs, that are generated from interactive gameplay associated with the primary user device, and secondary inputs, that are generated from interactive gameplay associated with the one or more secondary user devices, to generate aggregated inputs; receiving, over the network by the cloud gaming machine, the aggregated inputs from the primary user device; wherein executing the session of the cloud video game includes applying the aggregated inputs to update a game state of the cloud video game that is processed to generate the gameplay video.

In some implementations, the method enables substantially real-time interactive gameplay of the session of the cloud video game simultaneously through the primary user device and the one or more secondary user devices.

In some implementations, the cloud gaming machine does not communicate with the one or more secondary user devices.

In some implementations, the session of the cloud video game is defined as a single player session of the cloud video game.

In some implementations, the primary user device is configured to instantiate a socket through which the secondary inputs are received from the one or more secondary user device.

In some implementations, at least one of the secondary user devices is configured to execute a browser application that renders the gameplay video that is received over the peer-to-peer network.

In some implementations, streaming the gameplay video over the peer-to-peer network to the one or more secondary user devices includes accessing a WebRTC application programming interface (API) to enable instantiation of the peer-to-peer network.

In some implementations, processing the primary inputs and the secondary inputs to generate the aggregated inputs includes combining the primary inputs and the secondary inputs into a single input stream.

In some implementations, processing the primary inputs and the secondary inputs to generate the aggregated inputs includes determining popular inputs based on the primary inputs and the secondary inputs.

In some implementations, processing the primary inputs and the secondary inputs to generate the aggregated inputs includes determining, for a given input type and a current time interval, a single input command based on ones of the primary inputs and the secondary inputs that are of the given input type and which occur during the current time interval.

In some implementations, a non-transitory computer readable medium having program instructions embodied thereon is provided, the program instructions configured, when executed by at least one server computer, to cause said at least one server computer to perform a method including the following method operations: executing, by a cloud gaming machine, a session of a cloud video game, the session configured to generate gameplay video; streaming the gameplay video from the cloud gaming machine over a network to a primary user device, the primary user device configured to render the gameplay video to a primary display; wherein the primary user device is configured to stream the gameplay video over a peer-to-peer network to one or more secondary user devices, each of said secondary user devices being configured to render the gameplay video, respectively, to one or more secondary displays; wherein the primary user device is configured to process primary inputs, that are generated from interactive gameplay associated with the primary user device, and secondary inputs, that are generated from interactive gameplay associated with the one or more secondary user devices, to generate aggregated inputs; receiving, over the network by the cloud gaming machine, the aggregated inputs from the primary user device; wherein executing the session of the cloud video game includes applying the aggregated inputs to update a game state of the cloud video game that is processed to generate the gameplay video.

In some implementations, a system is provided, including: a cloud gaming machine configured to execute a session of a cloud video game, the session configured to generate gameplay video; the cloud gaming machine configured to stream the gameplay video from the cloud gaming machine over a network to a primary user device, the primary user device configured to render the gameplay video to a primary display; wherein the primary user device is configured to stream the gameplay video over a peer-to-peer network to one or more secondary user devices, each of said secondary user devices being configured to render the gameplay video, respectively, to one or more secondary displays; wherein the primary user device is configured to process primary inputs, that are generated from interactive gameplay associated with the primary user device, and secondary inputs, that are generated from interactive gameplay associated with the one or more secondary user devices, to generate aggregated inputs; receiving, over the network by the cloud gaming machine, the aggregated inputs from the primary user device; wherein executing the session of the cloud video game includes applying the aggregated inputs to update a game state of the cloud video game that is processed to generate the gameplay video.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Figure 1A:
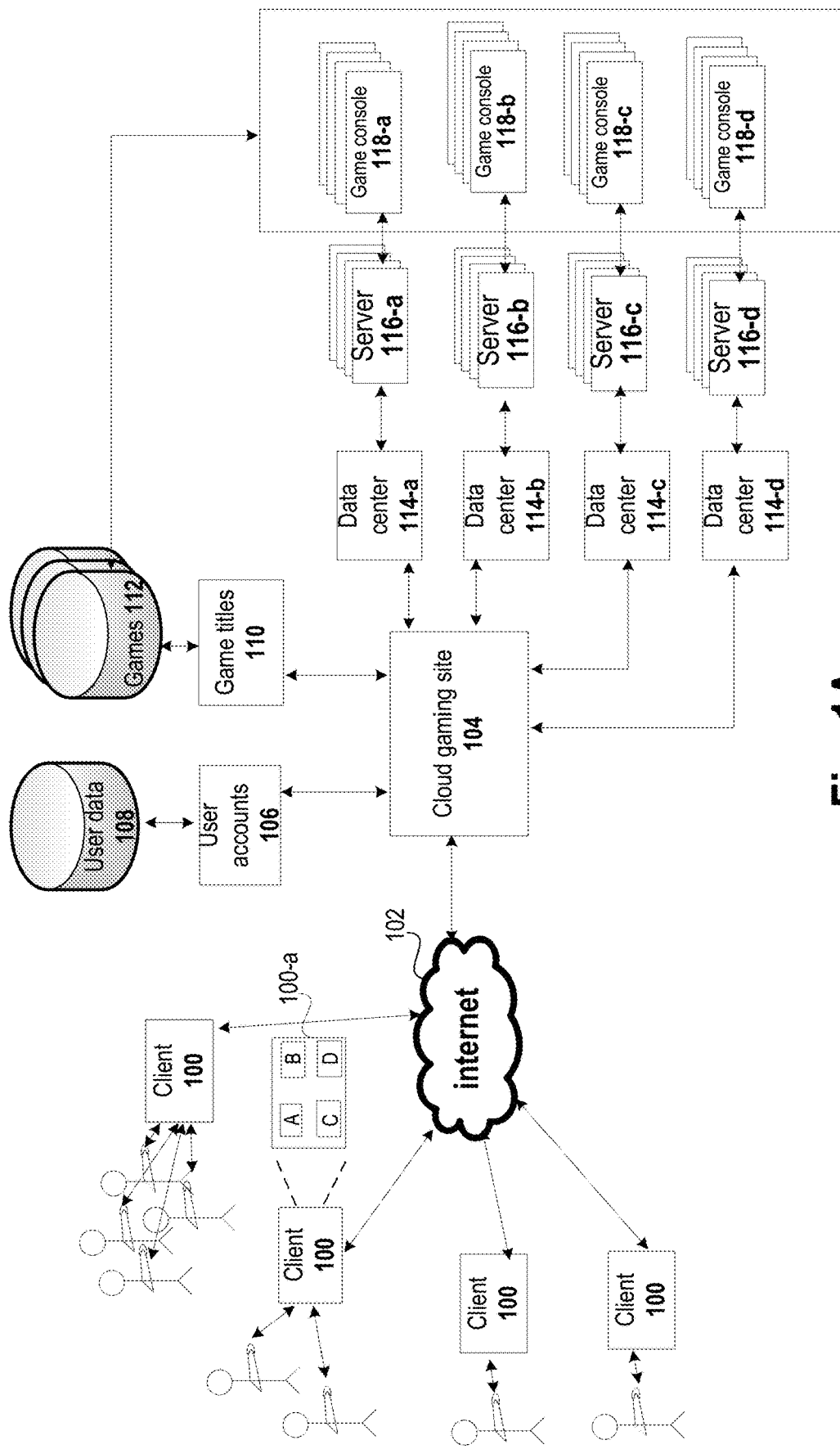
FIG. 1A illustrates a simplified block diagram of an exemplary system that is used to preload game content onto a cloud game server, in accordance with an embodiment of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

One example of a cloud gaming system is the Playstation® Now cloud gaming service. At present, in such a system, the client device can be a game console, such as a Playstation® 4 game console or another device such as a personal computer.

In an existing cloud gaming system (e.g. Playstation® Now), a cloud game machine (e.g. a cloud console device) exists in a data center, and a server sets up a connection between a primary client device (e.g. Playstation® 4 game console or a personal computer) and the cloud game machine. An optimal data center can be selected from which to stream the cloud video game, e.g. one that is expected to provide suitable performance in terms of latency, streaming bit rate, available cloud computing resources, server load balancing, etc. Then the streaming is directly between the cloud game machine and the primary client device, ideally providing fast connections allowing for sufficient performance to provide a satisfactory cloud gaming experience to the primary user.

However, when other remote secondary users wish to spectate the gaming session of the primary user, then this presents a challenge of how to provide the primary client device's video stream to the other remote users. One option is to stream from the same data center, and possibly even the same game machine, to the secondary client devices that are respectively associated with the secondary users. However, doing so places additional burdens on the data center's resources and the data center's network connection, reducing resource availability and connection bandwidth for other devices and sessions. Additionally, while the data center might be optimized for the primary client device, it might not provide good performance for one or more of the secondary client devices. For example, a secondary client device could be located significantly further away from the data center than the primary client device, and the secondary client device may suffer from poor connection speeds and diminished streaming performance.

In view of this, implementations in accordance with the present disclosure provide a system in which a peer-to-peer network is established between the primary client device and the secondary client devices, and streaming of the gameplay video (of the primary client device's cloud gaming session) occurs via this peer-to-peer network. In this way, the secondary client devices do not need to establish streaming connections with the cloud gaming service's servers, and so the cloud gaming service does not need to incur high server costs that would be associated with handling such streaming connections.

In some implementations, the peer-to-peer streaming is implemented using WebRTC technologies. In some implementations, the primary client device implements a streaming server, and can be configured to publish in UDP for optimal streaming performance. Conventionally, browsers use TCP/IP, which is a serial process such that if a packet is lost, then the connection is broken. However, UDP allows packets to be dropped without breaking connection, which is advantageous for streaming video.

Additionally, in some implementations, a socket or data channel is provided through which user input generated by the secondary client devices is transmitted to the primary client device. Such user input along with user input of the primary client device can be aggregated at the primary client device and transmitted from the primary client device to the cloud gaming service. In this way, the secondary users can not only spectate the primary user's session of the cloud video game, but also participate in playing. The cloud gaming machine does not need to communicate with the secondary client devices, and yet the secondary users are able to participate in playing the primary user's session of the cloud video game.

Thus, implementations in accordance with the present disclosure provide a primary client that leverages peer-to-peer technology (e.g. using WebRTC protocols) to enable multiple secondary clients to view the primary client's gameplay video, without placing additional strain on the system resources of the cloud gaming service. And furthermore, secondary users are able to participate in the gaming session of the primary user, through input that is aggregated at the primary client device and then transmitted to the cloud video game.

Thus, implementations in accordance with the present disclosure provide solutions to the problem of enabling satisfactory streaming gameplay of a video game by multiple users, without placing additional resource burdens on a cloud gaming service provider.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, other user-related data that may require uploading of additional game content. In some embodiments, game content is made available by streaming the game content from the game cloud system to a user's computing device for viewing and interacting. In some implementations, after loading user specific data, the game content is available for game play.

FIG. 1A illustrates an exemplary system used to load game files for a game available through a cloud gaming site. The system includes a plurality of client devices 100 that are communicatively connected to the cloud gaming site 104 over a network 102, such as the Internet. When a request to access the cloud gaming site 104 is received from a client device 100, the cloud gaming site 104 accesses user account information 106 stored in a user data store 108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 110 to identify the game titles that are available at the game cloud site for the user account initiating the request. The game titles data store 110, in turn, interacts with a games database 112 to obtain the game titles for all the games that are available for the cloud gaming site. As new games are introduced, the games database 112 will be updated with the game code and the game titles data store 110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 100-a, as shown in FIG. 1A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 1B:
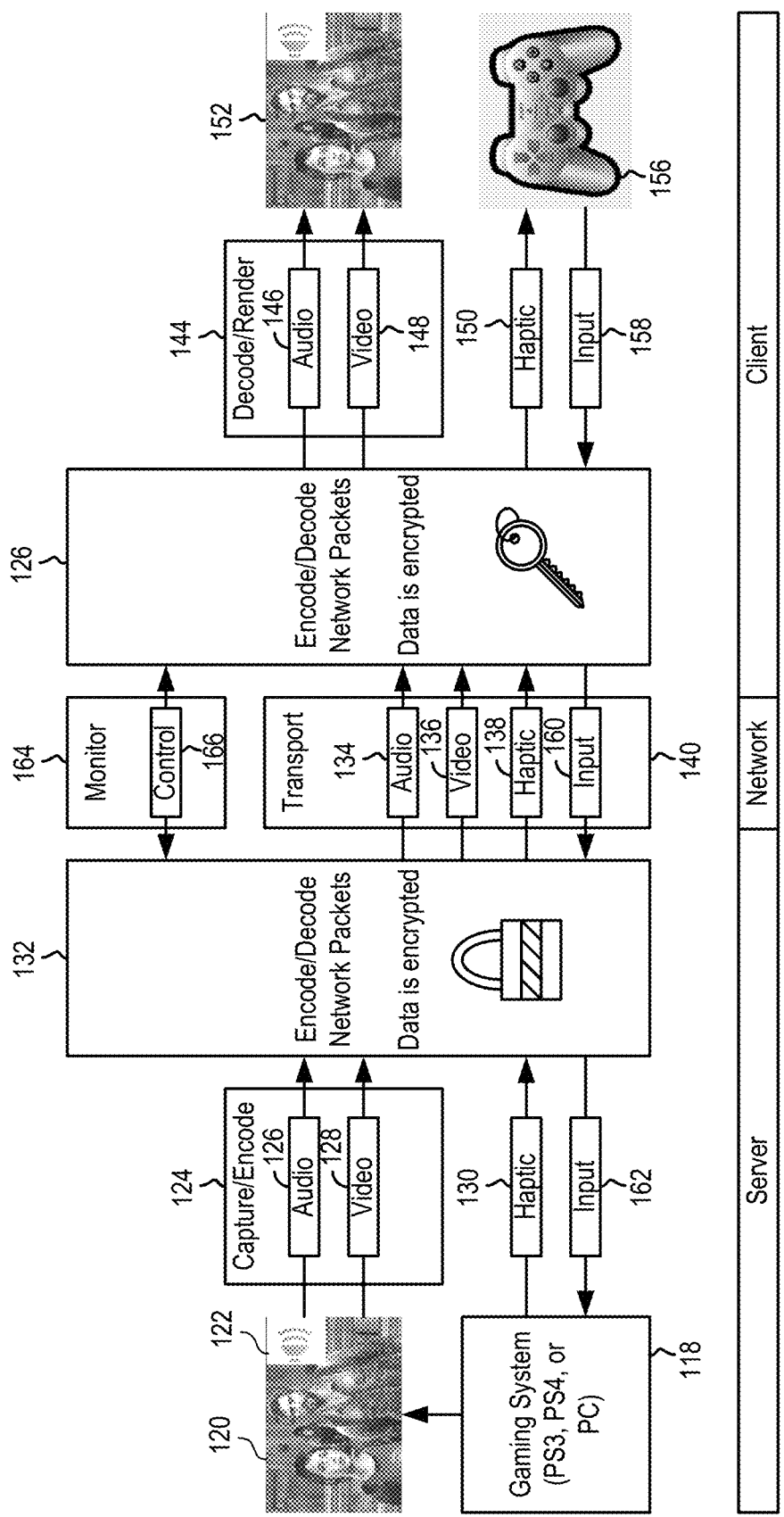
FIG. 1B is a flow diagram conceptually illustrating various operations which are performed for streaming a cloud video game to a client device, in accordance with implementations of the disclosure.

FIG. 1B is a flow diagram conceptually illustrating various operations which are performed for streaming a cloud video game to a client device, in accordance with implementations of the disclosure. The gaming system 118 executes a video game and generates raw (uncompressed) video 120 and audio 122. The video 120 and audio 122 are captured and encoded for streaming purposes, as indicated at reference 124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 126 and encoded video 128 are further packetized into network packets, as indicated at reference numeral 132, for purposes of transmission over a network such as the Internet. The network packet encoding process can also employ a data encryption process, thereby providing enhanced data security. In the illustrated implementation, audio packets 134 and video packets 136 are generated for transport over the network, as indicated at reference 140.

The gaming system 118 additionally generates haptic feedback data 130, which is also packetized into network packets for network transmission. In the illustrated implementation, haptic feedback packets 138 are generated for transport over the network, as further indicated at reference 140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 140, the audio, video, and haptic feedback packets are transported over a network, such as and/or including the Internet. As indicated at reference 142, the audio packets 134, video packets 136, and haptic feedback packets 138, are decoded/reassembled by the client device to define encoded audio 146, encoded video 148, and haptic feedback data 150 at the client device. If the data has been encrypted, then the network packets are also decrypted.

The encoded audio 146 and encoded video 148 are then decoded by the client device, as indicated at reference 144, to generate client-side raw audio and video data for rendering on a display device 152. The haptic feedback data 150 can be processed/communicated to produce a haptic feedback effect at a controller device 156 or other interface device through which haptic effects can be rendered. One example of a haptic effect is a vibration or rumble of the controller device 156.

It will be appreciated that a video game is responsive to user inputs, and thus, a similar procedural flow to that described above for transmission and processing of user input, but in the reverse direction from client device to server, can be performed. As shown, a user operating controller device 156 may generate input data 158. This input data 158 is packetized at the client device for transport over the network to the cloud gaming system. The input data packets 160 are unpacked and reassembled by the cloud gaming server to define input data 162 on the server-side. The input data 162 is fed to the gaming system 118, which processes the input data 162 to update the game state of the video game.

During transport (ref. 140) of the audio packets 134, video packets 136, and haptic feedback packets 138, the transmission of data over the network can be monitored to ensure the cloud game stream quality of service. For example, network conditions can be monitored as indicated by reference 164, including both upstream and downstream network bandwidth, and the game streaming can be adjusted in response to changes in available bandwidth. That is, the encoding and decoding of network packets can be controlled based on present network conditions, as indicated by reference 166.

Figure 2:
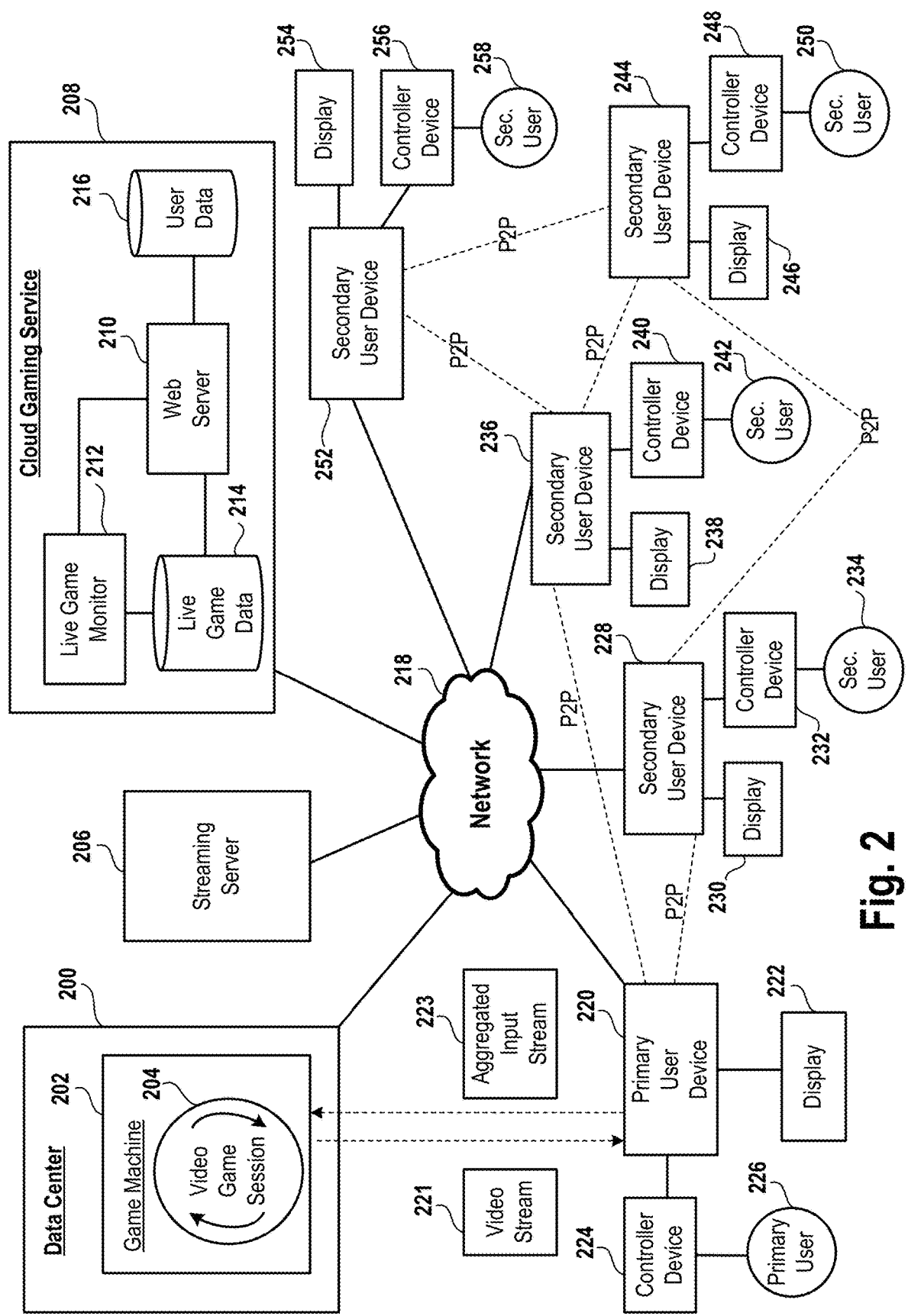
FIG. 2 conceptually illustrates a system for providing a cloud video game over a network to a plurality of users, in accordance with implementations of the disclosure.

FIG. 2 conceptually illustrates a system for providing a cloud video game over a network to a plurality of users, in accordance with implementations of the disclosure. In the illustrated implementation, a cloud video game is executed by a game machine 202, defining a video game session 204. The game machine 202 can be situated in a data center 200, along with other game machines capable of executing sessions of cloud video games for various client devices. It will be appreciated that in various implementations, the game machine 202 can be a game console, the hardware equivalent of a game console (e.g. bladed game console hardware), a server computer/blade, a virtual machine executing on hardware resources, or any other configuration of hardware capable of providing the appropriate execution environment for the cloud video game.

In the illustrated implementation, the video game session 204 is defined for a primary user 226. Hence, the video game session 204 is streamed over a network 218, which may include the Internet, to a primary user device 220 that is associated to the primary user 226. More specifically, the video game session 204 instantiates and maintains a game state that is updated based on received input commands. The game machine 202 renders video frames and audio based on the game state, defining a video stream 221 (including both moving image data and audio data) that is transmitted over the network 218 to the primary user device 220. As used in the present disclosure, and unless noted or otherwise apparent from the disclosure, video shall refer to both moving image data and corresponding audio data. The primary user device 220 renders the video stream to a display 222 for viewing by the primary user 226. The primary user 226 may interact with the video game through operation of a controller device 224, which can be any device through which the primary user 226 can provide interactive input to the video game, such as a gaming controller, peripheral, keyboard, mouse, touchpad, trackball, motion controller, video camera, depth camera, microphone, etc.

It will be appreciated that the primary user device 220 can be any of various types of devices, such as a game console, personal computer, laptop, portable gaming device, tablet, cellular phone, or any other networked device capable of receiving and rendering the video stream 221 from the game machine 202 to the display 222. The display 222 can be any type of display capable of displaying video from a video game session, including by way of example without limitation, a television, monitor, projector, touchscreen, head-mounted display (HMD), etc. In some implementations, the primary user device 220 and the display 222 can be integrated in the same form factor (e.g. laptop, tablet, cellular phone, etc.). It will be appreciated that in some implementations, the controller device 224 can also be integrated in the same form factor. It will be appreciated that similar concepts as described with reference to the devices associated with the primary user also apply to the devices associated with secondary users as described further below.

In the above-described implementation, the game machine 202 streams the video stream 221 to the primary user device 220. In some implementations, a streaming server 206 is invoked to handle streaming of the video stream 221 to the primary user device 220. The streaming server 206 may process raw video output by the game machine 202, such as by encoding it in a compressed format, transcoding it from one format/codec to another, adjusting its bit rate based on various considerations (e.g. network bandwidth, primary user device hardware capabilities, application/browser type of primary user device, etc.) to generate the video stream 221. In some implementations, the streaming server 206 is situated in the data center 200, whereas in other implementations, the streaming server 206 can be situated in other locations such as other data centers. In some implementations, the streaming server 206 is executed by the game machine 202.

In accordance with implementations of the disclosure, methods are provided to enable a plurality of secondary users to spectate and participate in the session of the primary user 226. In the illustrated implementation, such secondary users 234, 242, 250, and 258, are shown, associated to secondary user devices 228, 236, 244, and 252, respectively. The secondary user devices 228, 236, 244, and 252 are operatively connected to displays 230, 238, 246, and 254, respectively, as well as controller devices 232, 240, 248, and 256, respectively.

In accordance with implementations of the disclosure, the video rendered by the primary user device 220 is shared to the secondary user devices through peer-to-peer (P2P) sharing. That is, peer-to-peer connections amongst the primary user device and the secondary user devices are established (over the network 218), forming a P2P network through which the video is shared to all of the secondary user devices. It will be appreciated that the P2P sharing is substantially real-time, with minimal latency so that the secondary users are able to concurrently view the same video content of the video game session 204 that is being viewed by the primary user 226 with minimal lag. In this manner, the secondary users are able to spectate the gameplay of the primary user in substantially real-time.

In some implementations the P2P sharing is accomplished using WebRTC. For example, in some implementations, a peer-to-peer connection is established using the RTCPeerConnection API, and furthermore in accordance with Session Description Protocol (SDP). Broadly speaking, this entails signaling to exchange media configuration information by exchanging an offer and an answer using SDP.

Furthermore, in accordance with implementations of the disclosure, functionality is provided that enables the secondary users to participate in the gameplay of the primary user's video game session 204. For example, in some implementations, interactive input supplied by the secondary users can be transmitted back to the primary user device 220, where it is aggregated or processed in conjunction with the primary user's input. The aggregated input of the primary and secondary users is then transmitted as an input stream 223 to the game machine 202. In the illustrated implementation, the input from the secondary users can be generated by the secondary user's operation of their respective controller devices 232, 240, 248, and 256. Thus, for example, considering the viewing and gameplay experience of the secondary user 234, as the secondary user 234 views the shared gameplay video of the primary user 226 through the secondary user's display 230, the secondary user 234 may interact with the video by operating controller device 232. This generates inputs that are transmitted by the secondary user device 228 to the primary user device 220 (e.g. through a socket or other connection protocol configured to receive the input at the primary user device 220). It will be appreciated that a similar experience is provided to the other secondary users using their respective secondary user devices, displays, and controller devices.

In this manner, the secondary user devices provide secondary inputs to the primary user device 220, and the primary user device 220 may process these along with the primary inputs supplied by the primary user's 226 interactivity (through operation of the controller device 224), to generate the aggregated input stream 223. It will be appreciated that in various implementations, the combined inputs of the primary and secondary users can be processed in different ways. Regardless, in this manner, the secondary users are able to participate in the gameplay of the video game session 204 that is defined for the primary user 226. Further, from the standpoint of the game machine 202, it is only providing a session to a single client—that is the primary user device 220, and no additional cloud resources are required to enable the secondary users' participation. The game machine 202 (or streaming server 206, when invoked) does not need to communicate with the secondary user devices, yet the secondary users are able to view the gameplay and even participate in the gameplay.

In some implementations, the cloud video game and the spectating/participation functionality are provided by a cloud gaming service 208. Broadly speaking, the cloud gaming service 208 provides access to cloud video games for gameplay as well as access to spectate the gameplay of other users. In the illustrated implementation, the cloud gaming service 208 includes a web server 200 that receives and responds to requests over the network 218 from user devices operated by users of the cloud gaming service 208. In some implementations, the web server 210 receives and responds to requests to access the cloud gaming service 208, such as by facilitating authorization of login credentials and providing access to an interface for the cloud gaming service, which in some implementations can be in the form of one or more webpages when the requesting user device is accessing the cloud gaming service through a web browser. In providing such services, the web server 210 may access a user data storage 216, which may include various user-related data, such as login credentials, user gaming history, social graph information, achievements/trophies, game ownership, preferences/settings, etc.

In accordance with the illustrated implementation, the web server 210 may receive a request from the primary user device 220 to access a cloud video game, and in response to the request, the primary user device 220 is assigned to the game machine 202 at the data center 200, and the video game session 204 is initiated on the game machine 202 for the primary user 226.

Further, the web server 210 may receive requests from the secondary user devices 228, 236, 244, and 252 to access live gaming sessions. In the illustrated implementation, the cloud gaming service 208 includes a live game monitor 212 that is configured to obtain updates from in-progress cloud gaming sessions, and store the updates to a live game data storage 214. For example, such updates may include data identifying active cloud gaming sessions, representative recent screenshots, information/statistics about such sessions (e.g. duration of active session, user id associated with the session, number of players in a multiplayer session, game-related statistics, etc.), chat logs, etc. In responding to the aforementioned requests to access live gaming sessions, the web server 210 may access the live game data storage 214 to obtain and provide data regarding live gaming sessions to the requesting secondary user devices.

The web server 210 may further receive requests from the secondary user devices 228, 236, 244, and 252 to specifically spectate, and possibly participate in, the video game session 204 of the primary user 226. In response to such requests, the web server 210 may communicate the request to the primary user device 220, to initiate P2P sharing of the gameplay video as previously described.

Figure 3:
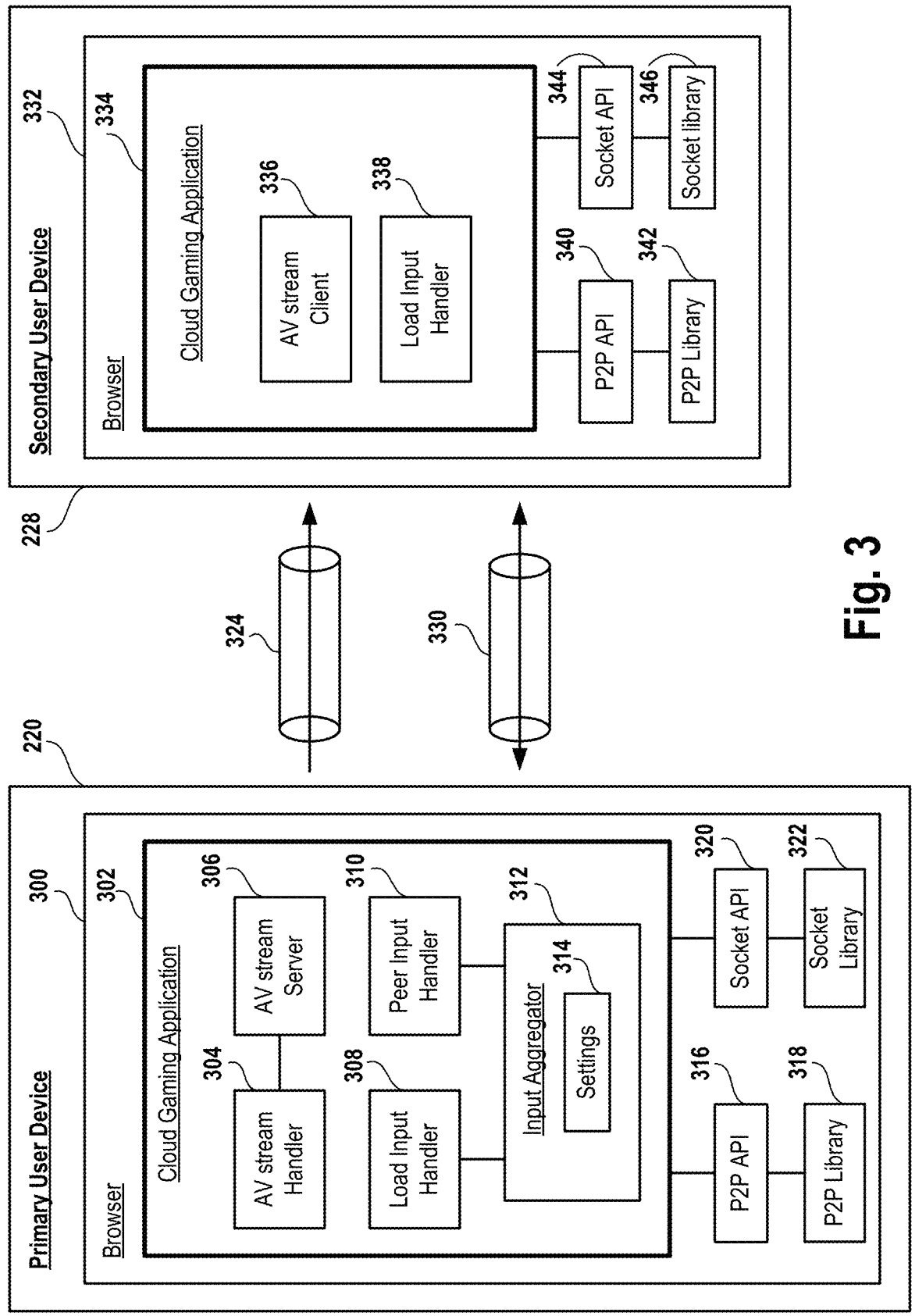
FIG. 3 conceptually illustrates componentry of the primary user device 220 and secondary user device 228, in accordance with implementations of the disclosure.

FIG. 3 conceptually illustrates componentry of the primary user device 220 and secondary user device 228, in accordance with implementations of the disclosure. In the illustrated implementation, the primary user device 220 executes a cloud gaming application 302 that is configured to perform the functionality to enable the shared gameplay of the video game session 204 as described herein. As noted above, the primary user device 220 can be any of various kinds of network enabled devices, such as a game console or personal computer. Accordingly, in some implementations the cloud gaming application 302 can be a dedicated or standalone application or app that executes over the operating system environment of the primary user device 220. Whereas in other implementations, the cloud gaming application 302 can be a web application and/or define various functional modules within the context of a web browser application 300.

In the illustrated implementation, the cloud gaming application 302 includes a video stream handler 304 that receives the video stream 221 and renders it to the display 222 as rendered gameplay video for viewing by the primary user 226. In some implementations, a video stream server 306 is executed at the primary user device 220 to facilitate the P2P sharing of the gameplay video. It will be appreciated that the video stream server 306 may access a P2P library 318 through a P2P API 316, to provide the P2P sharing functionality of the primary user device 220.

In some implementations wherein the P2P sharing is performed using WebRTC, then the video stream server 306 can be a WebRTC server configured to share/distribute the gameplay video over a P2P connection 324. In such implementations the P2P API 316 is a WebRTC API and the P2P library 318 is a WebRTC library.

The secondary user device 228, like the primary user device 220, can be any of various types of networked devices. In the illustrated implementation, the secondary user device 228 includes a cloud gaming application 324, that may be a standalone application/app or defined through a web browser 332. The cloud gaming application 324 includes a video stream client 336 that is configured to receive the gameplay video that is shared over the P2P connection 324. It will be appreciated that as the gameplay video is shared through a P2P network, so the video stream client 336 of the secondary user device 228 may receive portions of the gameplay video from other secondary user devices that are also part of the P2P network and that have received and are sharing portions of the gameplay video through the P2P network. Furthermore, the video stream client 336 may also share portions of the gameplay video to other secondary user devices in the P2P network. The video stream client 336 may access a P2P library 342 through a P2P API 340, which may be a WebRTC library and WebRTC API in some implementations.

In some implementations, the cloud gaming application 302 is configured to set up a socket 330 through which inputs from the various secondary user devices are received. The socket 330 can be defined through a socket library 322 accessed through a socket API 320. In some implementations, the socket 330 is defined using the socket.IO library and API.

In the illustrated implementation, the cloud gaming application 334 further includes a local input handler 338 that is configured to receive and transmit secondary input generated from interactivity by the secondary user 234 with the gameplay video that is rendered by the video stream client 336 of the secondary user device 228 to the display 230. For example, such secondary input can be generated through operation of the controller device 232 by the secondary user 234. The local input handler 338 transmits the input through the socket 330 to the primary user device 220.

A peer input handler 310 at the primary user device 220 is configured to receive the incoming secondary input from the secondary user device 228 (and from other secondary user devices). The cloud gaming application 302 of the primary user device 220 further includes a local input handler 308 that is configured to receive primary input generated from interactivity by the primary user 226 with the gameplay video of the video game session 204 that is rendered from the primary user device 220 to the display 222. Such primary input can be generated through operation of the controller device 224.

In the illustrated implementation, the cloud gaming application 302 of the primary user device 220 further includes an input aggregator 312 that is configured to aggregate and process the primary input (of the primary user) and the secondary input (of the secondary users). Various ways of aggregating and processing the primary and secondary input are contemplated as discussed in further detail below. The primary and secondary inputs are processed to define the aggregated input stream 223 that is communicated to the game machine 202, and applied to the video game session 204 to drive the execution of the session and update the game state of the video game. In this manner, the combination of input from the primary user 226 and the secondary users is utilized to play the cloud video game. It will be appreciated that this is accomplished in the context of the video game session 204 being defined for the primary user 226, but not necessarily for the secondary users. Yet the secondary users are enabled to view the same gameplay video in real-time and also interactively participate in affecting the gameplay and outcome of the video game.

Figure 4A:
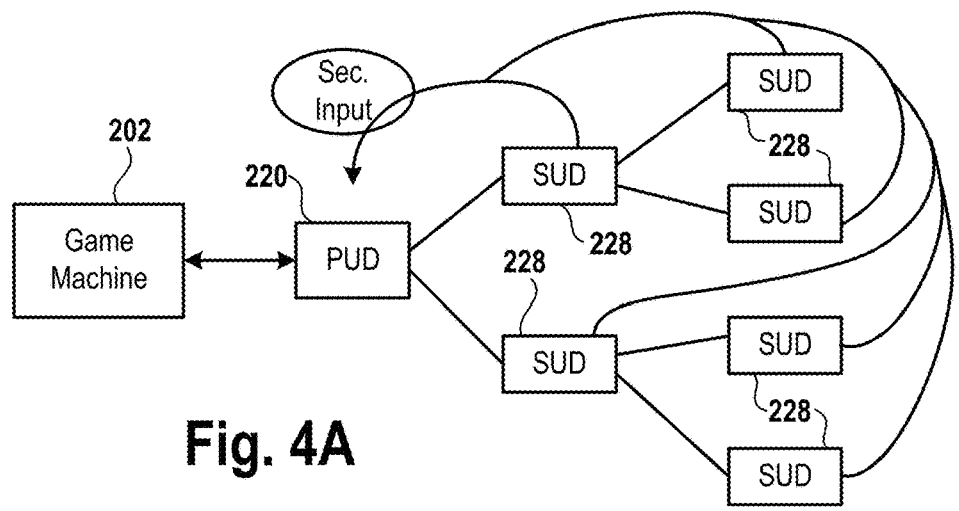
FIG. 4A conceptually illustrates a system wherein aggregation of input is handled at the primary client device, in accordance with implementations of the disclosure.

It will be appreciated that in various implementations the handling of the aggregation of input can be performed by various entities. FIG. 4A conceptually illustrates a system wherein aggregation of input is handled at the primary client device, in accordance with implementations of the disclosure. In the illustrated implementation, the primary user device 220 receives gameplay video from the game machine 202 and distributes the gameplay video through P2P sharing to the secondary user devices 228. Secondary input from the secondary user devices 228 is transmitted back to the primary user device 220 (e.g. through a socket at the primary user device 220). Thus, in the illustrated implementation, the aggregation of the secondary input and the primary input occurs at the primary user device 220. After the inputs are aggregated and processed by primary user device 220, the resulting combined input is transmitted to the game machine 202.

Figure 4B:
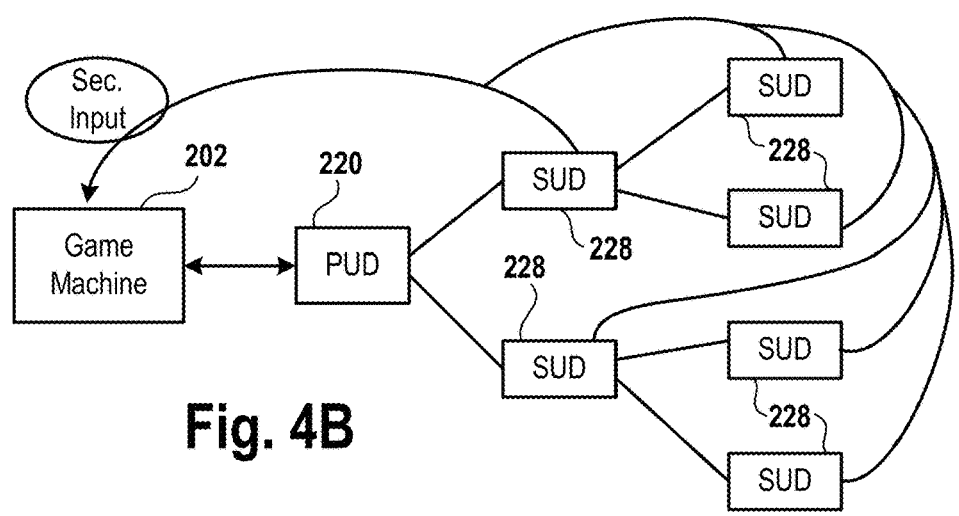
FIG. 4B conceptually illustrates a system wherein aggregation of input is handled at the game machine, in accordance with implementations of the disclosure.

FIG. 4B conceptually illustrates a system wherein aggregation of input is handled at the game machine, in accordance with implementations of the disclosure. In the illustrated implementation, the primary user device 220 receives gameplay video from the game machine 202 and distributes the gameplay video through P2P sharing to the secondary user devices 228. Secondary input from the secondary user devices 228 is transmitted back to the game machine 202. Also, the primary input from the primary user device 220 is also transmitted to the game machine 202. Thus, in the illustrated implementation, the aggregation of the secondary input and the primary input occurs at the game machine 202.

Figure 4C:
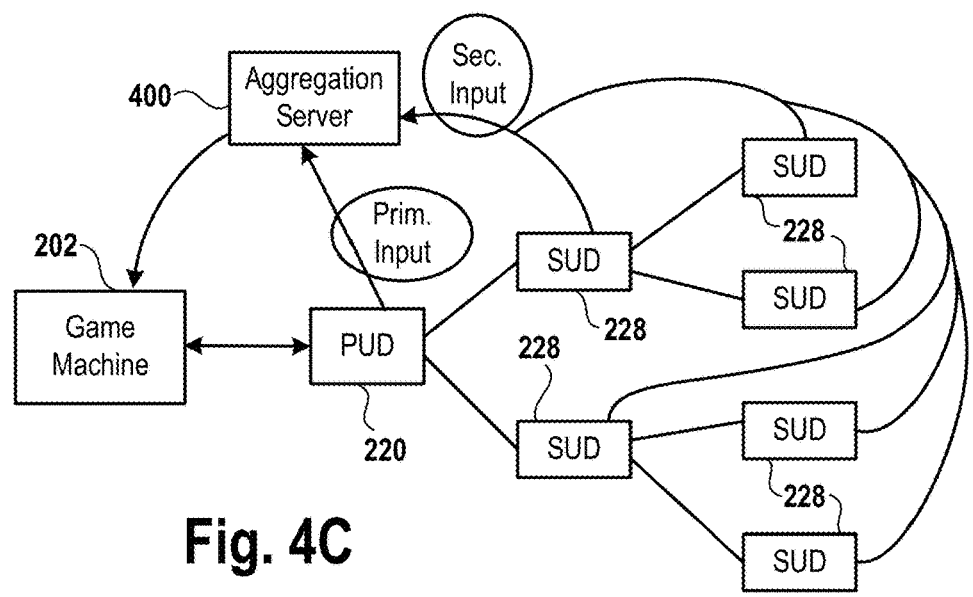
FIG. 4C conceptually illustrates a system wherein aggregation of input is handled at an aggregation server, in accordance with implementations of the disclosure.

FIG. 4C conceptually illustrates a system wherein aggregation of input is handled at an aggregation server, in accordance with implementations of the disclosure. In the illustrated implementation, the primary user device 220 receives gameplay video from the game machine 202 and distributes the gameplay video through P2P sharing to the secondary user devices 228. Secondary input from the secondary user devices 228 is transmitted to an aggregation server 400. The primary input from the primary user device 220 is also transmitted to the aggregation server 400. Thus, in the illustrated implementation, the aggregation of the secondary input and the primary input occurs at the aggregation server 400. After the inputs are aggregated and processed by the aggregation server 400, the resulting combined input is transmitted to the game machine 202.

It will be appreciated that in various implementations the primary and secondary inputs can be combined in many different ways for application to the video game session. For example, in some implementations, the primary and secondary inputs are aggregated together in accordance with their timing and provided directly to the video game session. That is, all of the inputs are provided to the video game session without further processing, so that each input provided by each user (both primary and secondary) is provided to the video game session.

In some implementations, the primary and secondary inputs are aggregated at periodic intervals and a single input (or subset of the inputs) is selected at each interval and transmitted to the video game session. For example, in some implementations the most popular input, or the input that occurs in the highest amount or frequency, is selected at each interval and transmitted to the video game session. In some implementations, more than one input is selected, such as the most popular set of inputs. It will be appreciated that the particular length of the periodic interval can vary in various implementations, for example ranging from on the order of milliseconds, to tenths of a second, to seconds, by way of example without limitation.

In some implementations, there may be different classes or types of inputs for the video game. Non-limiting examples include directional inputs (e.g. up, down, forward, backward, right, left, etc.), movement-type inputs (e.g. run, jump, strafe, crouch, accelerate, brake, etc.), weapon control inputs (e.g. fire, reload, change weapon, etc.), virtual device control inputs, etc. In some implementations the most popular input or set of inputs is selected and applied at each interval.

In some implementations, a threshold for an input or type of input can be applied. For example, for a given time interval, a given input may be selected, or may only be considered for selection (e.g. based on popularity as described above), if it has been selected a minimum number of times, or by a minimum fraction of the total number of users.

Additionally, in some implementations, the specific length of the periodic interval can be different for different input types/classes.

In some implementations, the inputs can be weighted to give priority to one or more users. For example, in some implementations the input of the primary user is weighted higher than the input of a secondary user. In this manner, the input of the primary user has greater influence on the input that is applied to the video game, while the input of the secondary users is still relevant. In some implementations, the specific weighting to be applied is configurable by the primary user, so that the primary user can set the weighting of the users according to his/her preference.

In some implementations, controls can be divided amongst different groups of users. In some implementations, such division of controls is configurable by the primary user through their primary user device. For example, one group of secondary users could be assigned to control a particular gameplay function (e.g. movement of a character) while another group of secondary users is assigned to control another gameplay function (e.g. weapon/attack control, such as weapon firing and selection).

In some implementations predefined templates can be made available for selection by the primary user, the predefined templates defining how the primary and secondary inputs are to be combined for purposes of playing the video game. This can be useful in providing certain default options for the primary user to choose from.

Figure 5A:
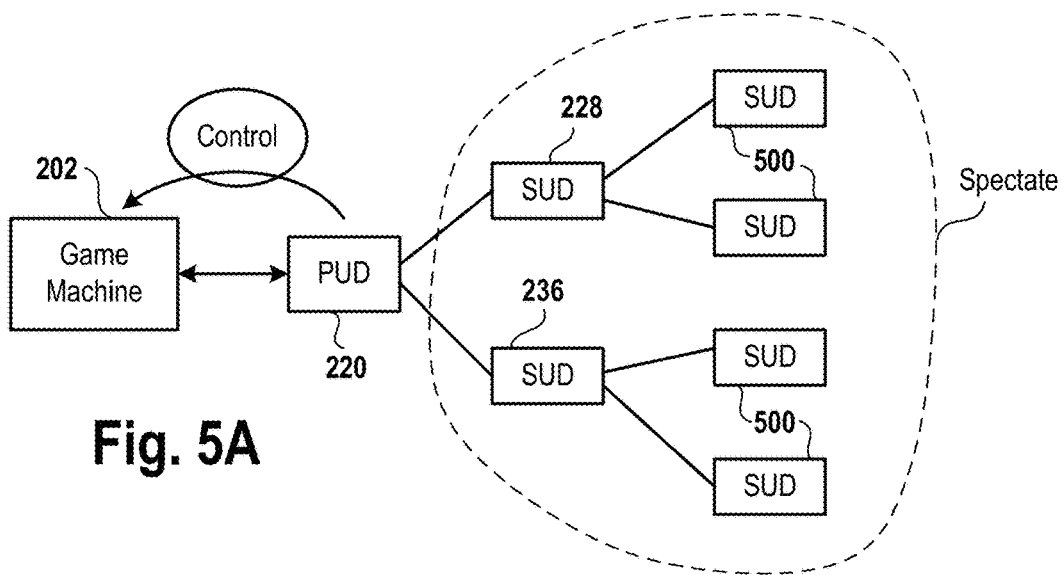
FIGS. 5A, 5B, and 5C conceptually illustrate the passing of control of the video game session between users, in accordance with implementations of the disclosure.
Figure 5B:
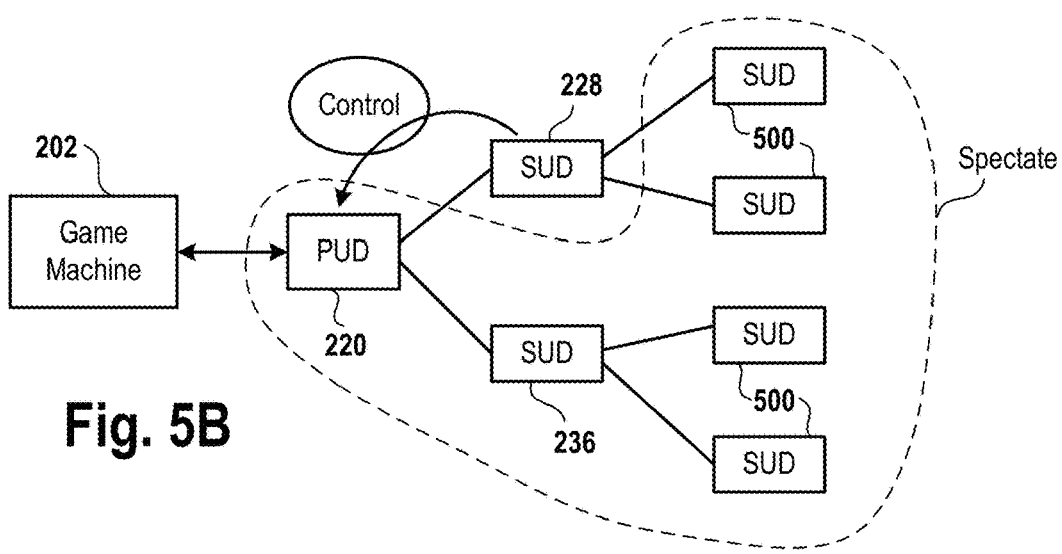
Figure 5C:
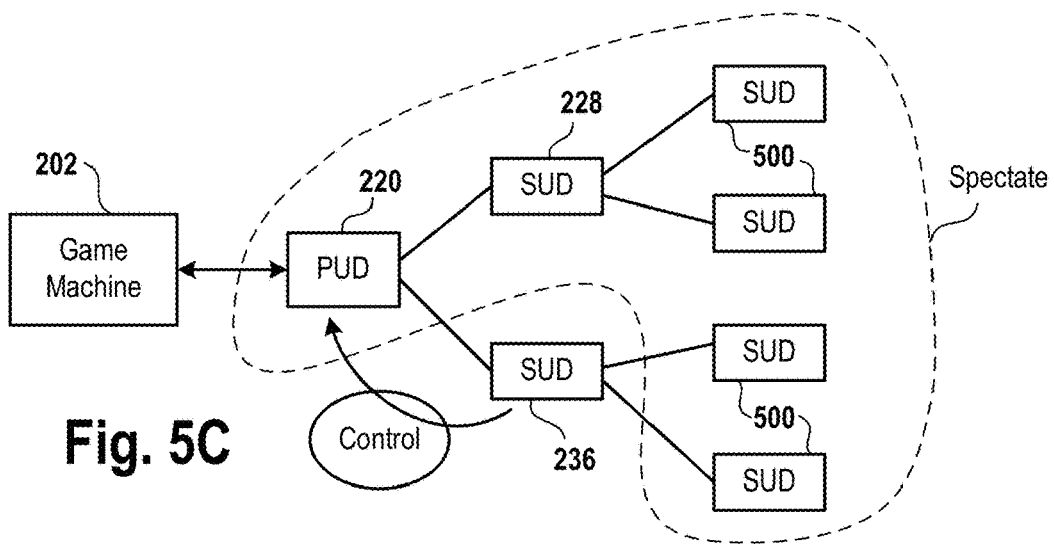

FIGS. 5A, 5B, and 5C conceptually illustrate the passing of control of the video game session between users, in accordance with implementations of the disclosure. In the illustrated implementation, at FIG. 5A, the gameplay video of the video game is streamed from the game machine 202 to the primary user device 220. The gameplay video is also P2P shared to the secondary user devices 228, 236, and 500. As shown at FIG. 5A, though all the primary and secondary users are able to view the gameplay video in substantially real-time, only the primary user is controlling the gameplay by supplying input to the video game session via the primary user device 220. The secondary users 228, 236, and 500 are spectating the gameplay video of the primary user but not participating in controlling the gameplay.

However, in accordance with implementations of the disclosure, the primary user can pass control of the gameplay to one of the secondary users. In some implementations, the primary user can offer control to a secondary user, or in some implementations, one or more secondary users can "call next" and/or request to assume control of the gameplay. It will be appreciated that in some implementations the passing of control is contingent upon permission being given by the primary user 226 associated with the primary user device 220. In some implementations, the passing of control can proceed according to a queue of the secondary user devices, such that secondary users requesting to assume control of the gameplay are placed in the queue in the order of their requests, and control is passed to each in turn according to their ordering.

In the illustrated implementation shown at FIG. 5B, control of the gameplay has been passed to the secondary user device 228. Thus, inputs from the secondary user device 228 are transmitted to the primary user device 220, which then forwards the inputs to the game machine 202 to be applied to the video game session to drive the execution of the game state. In this mode of gameplay, the secondary user 234 that provides input through the secondary user device 228 (for example, operating controller device 232) is controlling the gameplay, even though the session is defined for the primary user 226 of primary user device 220. It will be appreciated that the primary user device 220, and the secondary user devices 236 and 500 are spectating the gameplay but not actively controlling it.

In the illustrated implementation shown at FIG. 5C, control of the gameplay has been passed to the secondary user device 236. Thus, inputs from the secondary user device 236 are transmitted to the primary user device 220, which then forwards the inputs to the game machine 202 to be applied to the video game session to drive the execution of the game state. In this mode of gameplay, the secondary user 242 that provides input through the secondary user device 236 (for example, operating controller device 240) is controlling the gameplay, even though the session is defined for the primary user 226 of primary user device 220. It will be appreciated that the primary user device 220, and the secondary user devices 228 and 500 are spectating the gameplay but not actively controlling it.

Figure 6A:
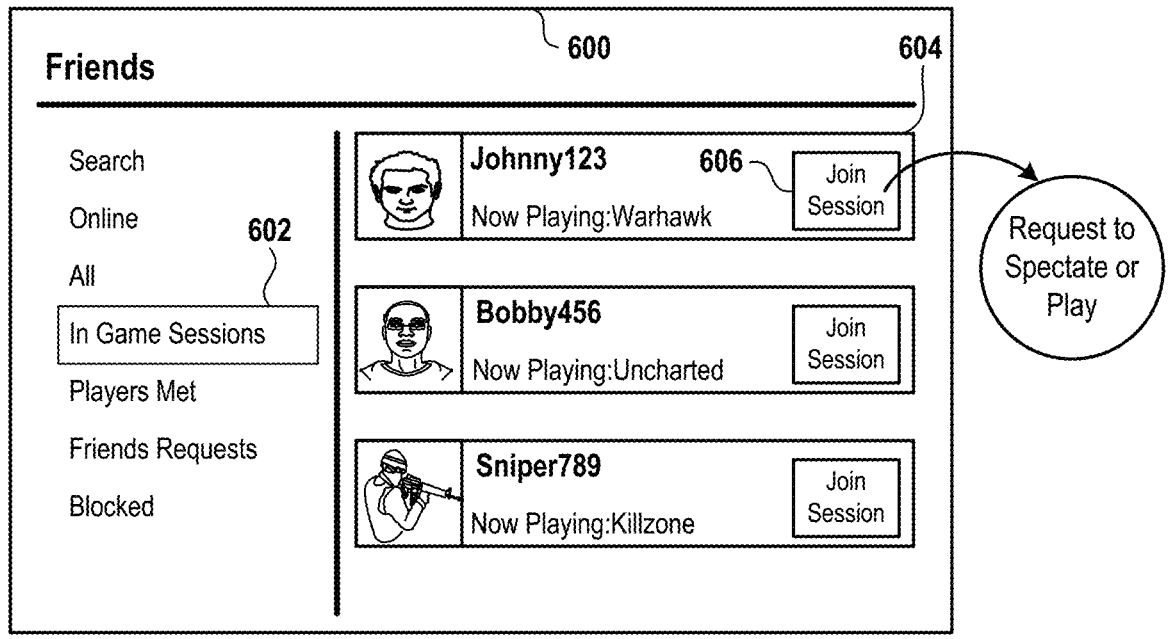
FIG. 6A illustrates an interface 600 for accessing the gameplay of an online user of a cloud gaming system, in accordance with implementations of the disclosure.

FIG. 6A illustrates an interface 600 for accessing the gameplay of an online user of a cloud gaming system, in accordance with implementations of the disclosure. In the illustrated implementation, the interface 600 provides access to information relating to friends of the primary user on a social network. The social network can be a social network of the cloud gaming system, or another social network. As shown, various options are provided, such as a "Search" feature to enable searching for a specific user, an "Online" feature to view friends that are currently online, an "All" feature to view all of the primary user's friends, an "In Game Sessions" feature 602 to view friends that are currently engaged in active gaming sessions, a "Players Met" feature to view id's of players that the user has encountered in another context (e.g. during multiplayer gameplay of a video game), a "Friend Requests" feature to view requests to/from the primary user to become friends on the social network, and a "Blocked" feature to view users that have been blocked from communicating or interacting with the primary user on the social network.

As shown in the illustrated implementation, the "In Game Sessions" feature 602 has been selected from the interface 600, thereby revealing on the right side of the interface a listing of the user's friends that are currently engaged in active gameplay sessions. The listing of such friends can be in the form of a series of profile entries, such as entry 604, and may further include related information, such as the user id of a friend, a profile picture, the particular video game title that they are playing, their duration of gameplay, their current level, etc. Furthermore, a "Join Session" feature 606 is provided, wherein selection of the feature 606 enables the primary user to request to spectate or join the gameplay of the video game session. Thus, as shown in the illustrated implementation, the current primary user can request to join the session of the user "Johnny123" as a spectator only, or as a participant as well. It will be appreciated that in either case, the streaming of the gameplay video occurs via P2P sharing as described above. And if the current user is permitted to join as a participant, then the current user's input is transmitted to the user device associated with the user "Johnny123," e.g. via a socket at the user device.

Figure 6B:
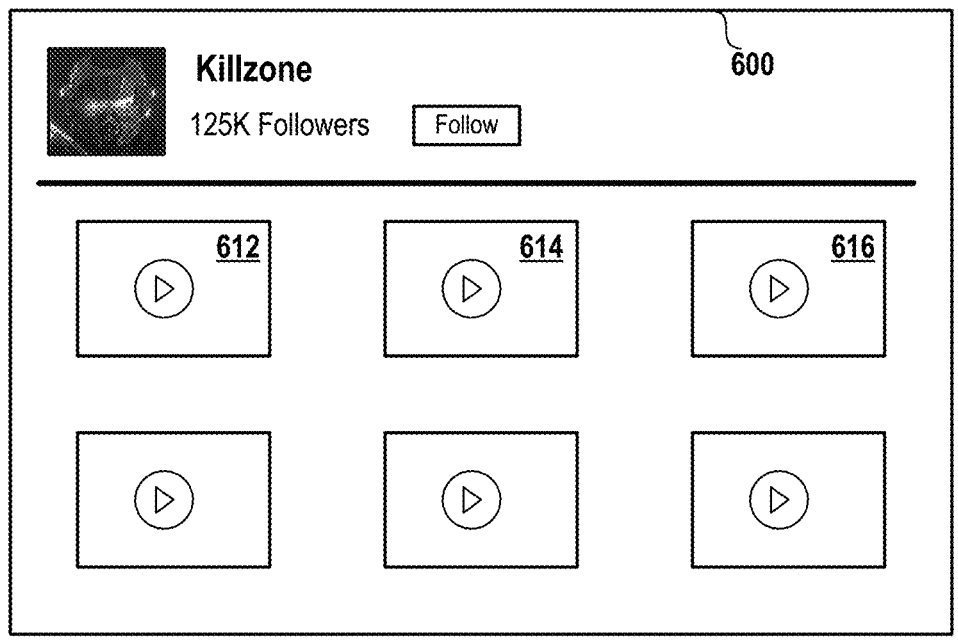
FIG. 6B illustrates an interface 610 for providing access to spectate and/or participate in the gameplay of a session of a user in a cloud gaming system, in accordance with implementations of the disclosure.

FIG. 6B illustrates an interface 610 for providing access to spectate and/or participate in the gameplay of a session of a user in a cloud gaming system, in accordance with implementations of the disclosure. In the illustrated implementation, the interface 610 is configured to provide access to view live in-progress gaming sessions. For example, various icons 612, 614, and 616 indicate video game sessions that are currently live and available for spectating. In some implementations by selecting an icon, the user of the system is then provided with a live video feed of the gaming session. It will be appreciated that the live video feed can be provided using P2P sharing as described above.

Furthermore, in some implementations a user accessing a live video feed of a given game session may also request to join the gameplay as a participant. Upon approval of the request, which may be automatic in some instances or subject to the session owner's explicit approval, then the input from the user that is accessing the live video feed is supplied back to the session owner's device, as described previously, and applied to the video game session executed by the game machine.

In some implementations, a session owner may configure settings to determine whether another user is permitted to join as a participant (as opposed to as a spectator only) in their session gameplay. In some implementations the option to join as a participant can be configured to be provided only to friends of the session owner on a social network, such as a social network associated with the cloud gaming system. In some implementations, game-related settings can be applied, such as only allowing players with a minimum experience level to join as a participant.

In some implementations, a group chat session is provided during crowd-sourced gaming, so that users may communicate with each other through voice/text chat.

Figure 7:
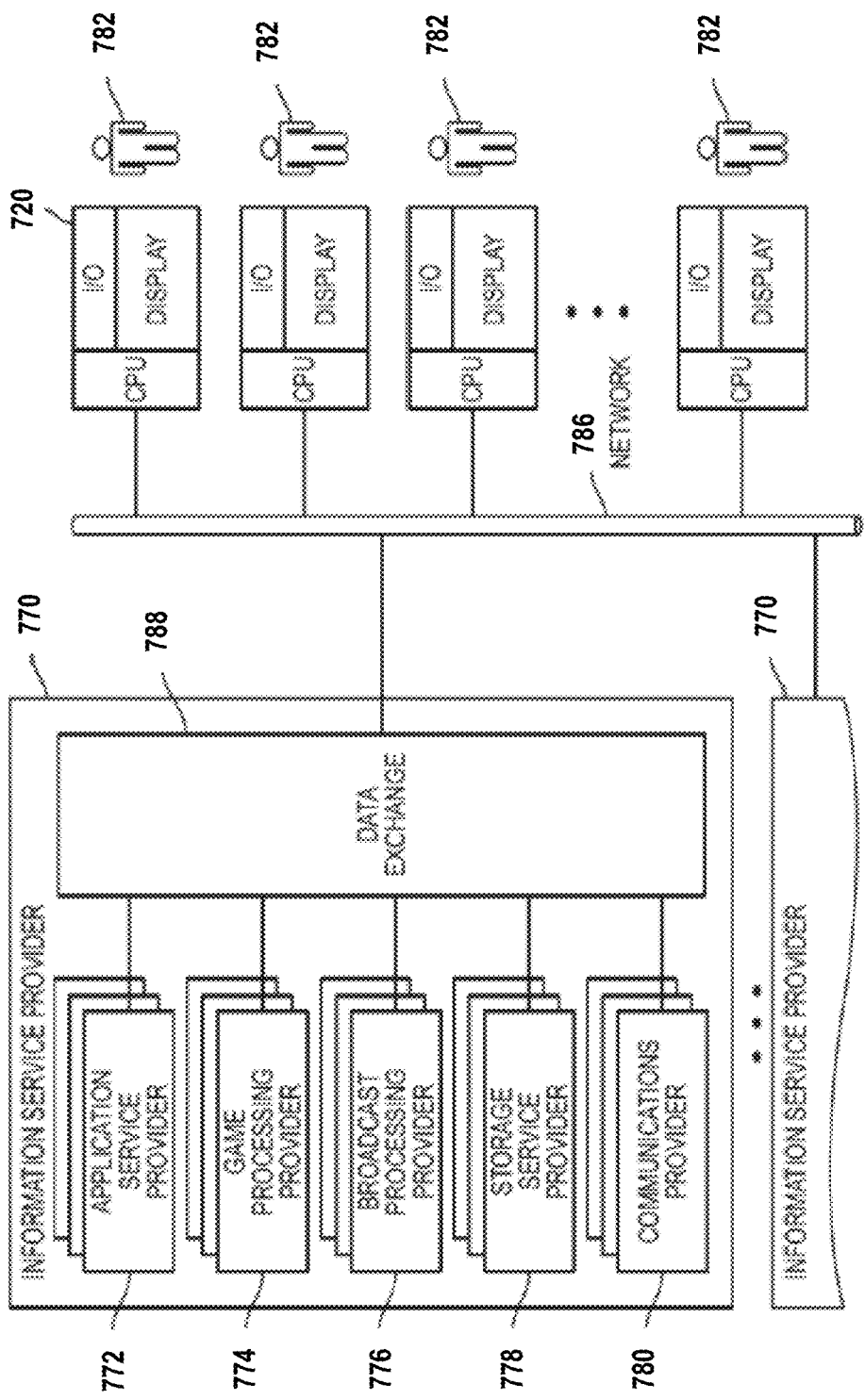
FIG. 7 illustrates an exemplary Information Service Provider architecture for delivering informational content and services to users who are geographically dispersed and connected via a network, in accordance with implementations of the disclosure.

FIG. 7 illustrates an embodiment of an Information Service Provider architecture. Information Service Providers (ISP) 770 delivers a multitude of information services to users 782 geographically dispersed and connected via network 786. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 770 includes Application Service Provider (ASP) 772, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 770 includes a Game Processing Server (GPS) 774 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 776 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 778 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 780 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 788 interconnects the several modules inside ISP 770 and connects these modules to users 782 via network 786. Data Exchange 788 can cover a small area where all the modules of ISP 770 are in close proximity, or can cover a large geographic area when the different modules are geographically dispersed. For example, Data Exchange 788 can include a fast Gigabit Ethernet (or faster) within a cabinet of a data center, or an intercontinental virtual area network (VLAN).

Users 782 access the remote services with client device 784, which includes at least a CPU, a memory, a display and I/O. The client device can be a PC, a mobile phone, a netbook, tablet, gaming system, a PDA, etc. In one embodiment, ISP 770 recognizes the type of device used by the client and adjusts the communication method employed. In other cases, client devices use a standard communications method, such as html, to access ISP 770.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

Figure 8:
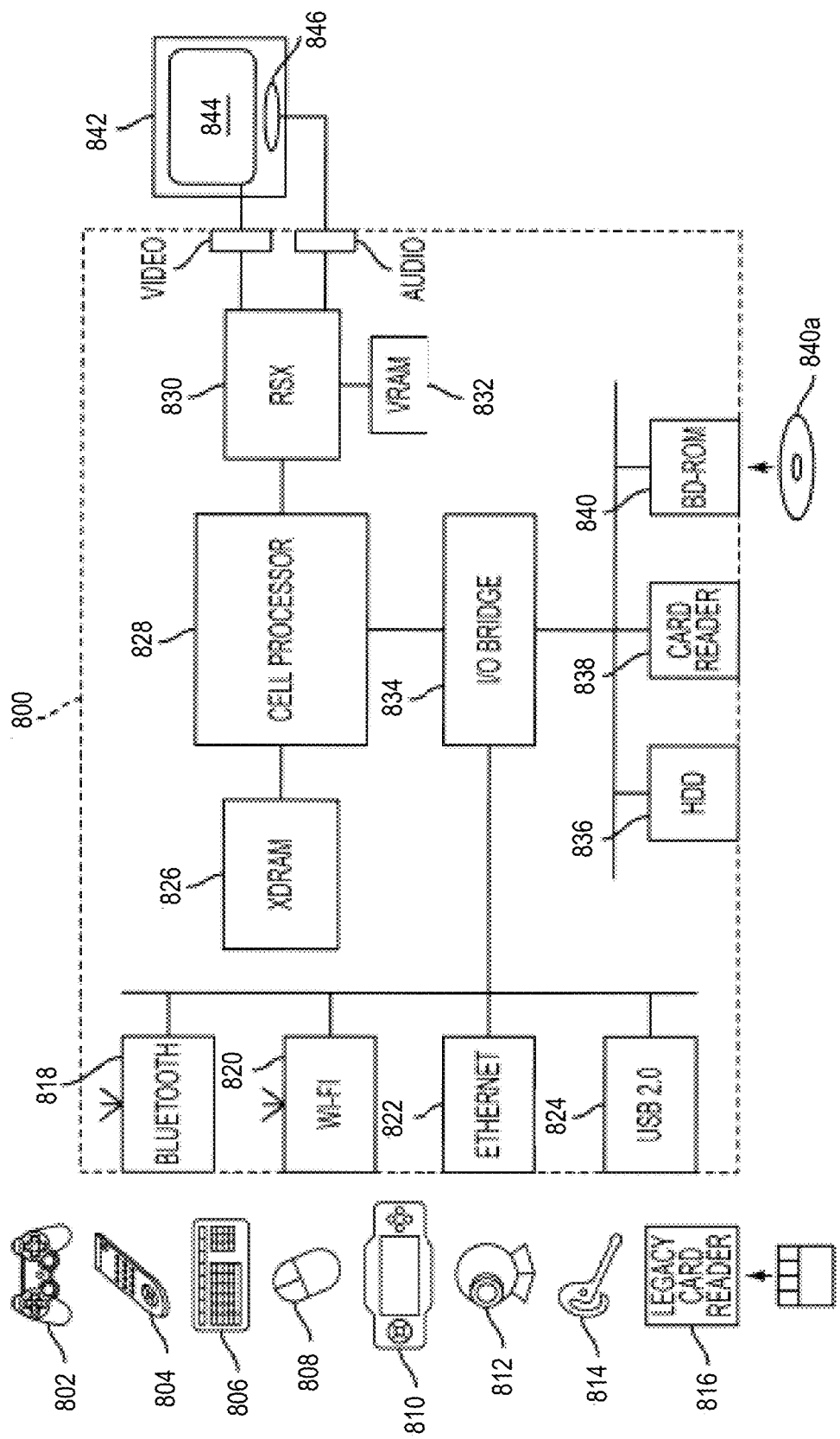
FIG. 8 illustrates exemplary components of a computing device used for controlling content presented to a user, in accordance with implementations of the disclosure.

FIG. 8 schematically illustrates the overall system architecture of a gaming console, such as Sony® Playstation 3® entertainment device, that may be compatible with controllers for implementing an avatar control system in accordance with one embodiment of the present disclosure. A system unit 800 is provided, with various peripheral devices connectable to the system unit 800. The system unit 800 can in some implementations be a computing server. The system unit 800 comprises: a Cell processor 828; a Rambus® dynamic random access memory (XDRAM) unit 826; a Reality Synthesizer graphics unit 830 with a dedicated video random access memory (VRAM) unit 832; and an I/O bridge 834. The system unit 800 also comprises a Blu Ray® Disk BD-ROM® optical disk reader 840 for reading from a disk 840a and a removable slot-in hard disk drive (HDD) 836, accessible through the I/O bridge 834. Optionally the system unit 800 also comprises a memory card reader 838 for reading compact flash memory cards, Memory Stick® memory cards and the like, which is similarly accessible through the I/O bridge 834.

The I/O bridge 834 also connects to six Universal Serial Bus (USB) 2.0 ports 824; a gigabit Ethernet port 822; an IEEE 802.11b/g wireless network (Wi-Fi) port 820; and a Bluetooth® wireless link port 818 capable of supporting of up to seven Bluetooth connections.

In operation the I/O bridge 834 handles all wireless, USB and Ethernet data, including data from one or more game controllers 802. For example when a user is playing a game, the I/O bridge 834 receives data from the game controller 802 via a Bluetooth link and directs it to the Cell processor 828, which updates the current state of the game accordingly.

The wireless, USB and Ethernet ports also provide connectivity for other peripheral devices in addition to game controllers 802, such as: a remote control 804; a keyboard 806; a mouse 808; a portable entertainment device 810 such as a Sony Playstation Portable® entertainment device; a video camera such as an EyeToy® video camera 812; and a microphone headset 814. Such peripheral devices may therefore in principle be connected to the system unit 800 wirelessly; for example the portable entertainment device 810 may communicate via a Wi-Fi ad-hoc connection, whilst the microphone headset 814 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 816 may be connected to the system unit via a USB port 824, enabling the reading of memory cards 848 of the kind used by the Playstation® or Playstation 2® devices.

In the present embodiment, the game controller 802 is operable to communicate wirelessly with the system unit 800 via the Bluetooth link. However, the game controller 802 can instead be connected to a USB port, thereby also providing power by which to charge the battery of the game controller 802. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 804 is also operable to communicate wirelessly with the system unit 800 via a Bluetooth link. The remote control 804 comprises controls suitable for the operation of the Blu Ray™ Disk BD-ROM reader 840 and for the navigation of disk content.

The Blu Ray™ Disk BD-ROM reader 840 is operable to read CD-ROMs compatible with the Playstation and PlayStation 2 devices, in addition to conventional pre-recorded and recordable CDs, and so-called Super Audio CDs. The reader 840 is also operable to read DVD-ROMs compatible with the PlayStation 2 and PlayStation 3 devices, in addition to conventional pre-recorded and recordable DVDs. The reader 840 is further operable to read BD-ROMs compatible with the Playstation 3 device, as well as conventional pre-recorded and recordable Blu-Ray Disks.

The system unit 800 is operable to supply audio and video, either generated or decoded by the Playstation 3 device via the Reality Synthesizer graphics unit 830, through audio and video connectors to a display and sound output device 842 such as a monitor or television set having a display 844 and one or more loudspeakers 846. The audio connectors 850 may include conventional analogue and digital outputs whilst the video connectors 852 may variously include component video, S-video, composite video and one or more High Definition Multimedia Interface (HDMI) outputs. Consequently, video output may be in formats such as PAL or NTSC, or in '720p, 1080i or 1080p high definition.

Audio processing (generation, decoding and so on) is performed by the Cell processor 828. The Playstation 3 device's operating system supports Dolby® 5.1 surround sound, Dolby® Theatre Surround (DTS), and the decoding of 7.1 surround sound from Blu-Ray® disks.

In the present embodiment, the video camera 812 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 800. The camera LED indicator is arranged to illuminate in response to appropriate control data from the system unit 800, for example to signify adverse lighting conditions. Embodiments of the video camera 812 may variously connect to the system unit 800 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 800, an appropriate piece of software such as a device driver should be provided. Device driver technology is well-known and will not be described in detail here, except to say that the skilled man will be aware that a device driver or similar software interface may be required in the present embodiment described.

Figure 9:
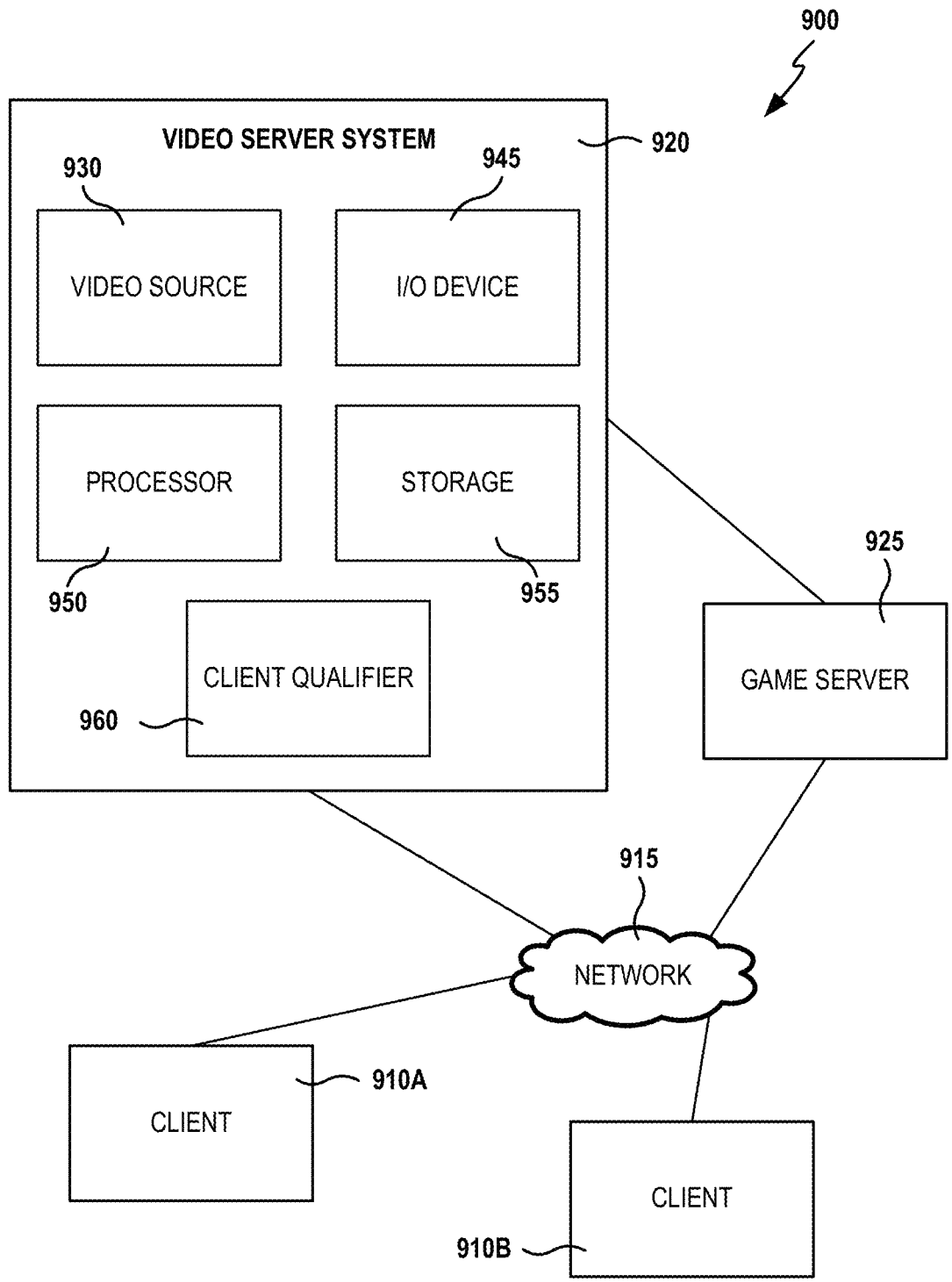
FIG. 9 is a block diagram of a Game System 900, in accordance with implementations of the disclosure.

FIG. 9 is a block diagram of a Game System 900, in accordance with implementations of the disclosure. Game System 900 is configured to provide a video stream to one or more Clients 910 via a Network 915. Game System 900 typically includes a Video Server System 920 and an optional game server 925. Video Server System 920 is configured to provide the video stream to the one or more Clients 910 with a minimal quality of service. For example, Video Server System 920 may receive a game command that changes the state of or a point of view within a video game, and provide Clients 910 with an updated video stream reflecting this change in state with minimal lag time. The Video Server System 920 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 920 frames per second. Although higher or lower frame rates are included in alternative embodiments of the disclosure.

Clients 910, referred to herein individually as 910A, 910B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 910 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 910 or on a separate device such as a monitor or television. Clients 910 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 910 are optionally geographically dispersed. The number of clients included in Game System 900 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 920 to deliver a game viewed through the HMD. In one embodiment, the game console receives the video stream from the video server system 920, and the game console forwards the video stream, or updates to the video stream, to the HMD for rendering.

Clients 910 are configured to receive video streams via Network 915. Network 915 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 910 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 910 may, but are not required to, further include systems configured for modifying received video. For example, a client may be configured to perform further rendering, to overlay one video image on another video image, to crop a video image, and/or the like. For example, Clients 910 may be configured to receive various types of video frames, such as I-frames, P-frames and B-frames, and to process these frames into images for display to a user. In some embodiments, a member of Clients 910 is configured to perform further rendering, shading, conversion to 3-D, or like operations on the video stream. A member of Clients 910 is optionally configured to receive more than one audio or video stream. Input devices of Clients 910 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 910 is generated and provided by Video Server System 920. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 910 are typically configured to receive inputs from a user. These inputs may include game commands configured to change the state of the video game or otherwise affect game play. The game commands can be received using input devices and/or may be automatically generated by computing instructions executing on Clients 910. The received game commands are communicated from Clients 910 via Network 915 to Video Server System 920 and/or Game Server 925. For example, in some embodiments, the game commands are communicated to Game Server 925 via Video Server System 920. In some embodiments, separate copies of the game commands are communicated from Clients 910 to Game Server 925 and Video Server System 920. The communication of game commands is optionally dependent on the identity of the command. Game commands are optionally communicated from Client 910A through a different route or communication channel that that used to provide audio or video streams to Client 910A.

Game Server 925 is optionally operated by a different entity than Video Server System 920. For example, Game Server 925 may be operated by the publisher of a multi-player game. In this example, Video Server System 920 is optionally viewed as a client by Game Server 925 and optionally configured to appear from the point of view of Game Server 925 to be a prior art client executing a prior art game engine. Communication between Video Server System 920 and Game Server 925 optionally occurs via Network 915. As such, Game Server 925 can be a prior art multiplayer game server that sends game state information to multiple clients, one of which is game server system 920. Video Server System 920 may be configured to communicate with multiple instances of Game Server 925 at the same time. For example, Video Server System 920 can be configured to provide a plurality of different video games to different users. Each of these different video games may be supported by a different Game Server 925 and/or published by different entities. In some embodiments, several geographically distributed instances of Video Server System 920 are configured to provide game video to a plurality of different users. Each of these instances of Video Server System 920 may be in communication with the same instance of Game Server 925. Communication between Video Server System 920 and one or more Game Server 925 optionally occurs via a dedicated communication channel. For example, Video Server System 920 may be connected to Game Server 925 via a high bandwidth channel that is dedicated to communication between these two systems.

Video Server System 920 comprises at least a Video Source 930, an I/O Device 945, a Processor 950, and non-transitory Storage 955. Video Server System 920 may include one computing device or be distributed among a plurality of computing devices. These computing devices are optionally connected via a communications system such as a local area network.

Video Source 930 is configured to provide a video stream, e.g., streaming video or a series of video frames that form a moving picture. In some embodiments, Video Source 930 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 925. Game Server 925 may maintain a copy of the state of the game based on game commands received from multiple players using geographically disperse clients. In these cases, the game state is provided by Game Server 925 to Video Source 930, wherein a copy of the game state is stored and rendering is performed. Game Server 925 may receive game commands directly from Clients 910 via Network 915, and/or may receive game commands via Video Server System 920.

Video Source 930 typically includes rendering logic, e.g., hardware, firmware, and/or software stored on a computer readable medium such as Storage 955. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 910. For example, the raw video may be encoded according to an Adobe Flash® standard, .wav, H.265, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 930 includes a video recording device such as a camera. This camera may be used to generate delayed or live video that can be included in the video stream of a computer game. The resulting video stream, optionally includes both rendered images and images recorded using a still or video camera. Video Source 930 may also include storage devices configured to store previously recorded video to be included in a video stream. Video Source 930 may also include motion or positioning sensing devices configured to detect motion or position of an object, e.g., person, and logic configured to determine a game state or produce video-based on the detected motion and/or position.

Video Source 930 is optionally configured to provide overlays configured to be placed on other video. For example, these overlays may include a command interface, log in instructions, messages to a game player, images of other game players, video feeds of other game players (e.g., webcam video). In embodiments of Client 910A including a touch screen interface or a gaze detection interface, the overlay may include a virtual keyboard, joystick, touch pad, and/or the like. In one example of an overlay a player's voice is overlaid on an audio stream. Video Source 930 optionally further includes one or more audio sources.

In embodiments wherein Video Server System 920 is configured to maintain the game state based on input from more than one player, each player may have a different point of view comprising a position and direction of view. Video Source 930 is optionally configured to provide a separate video stream for each player based on their point of view. Further, Video Source 930 may be configured to provide a different frame size, frame data size, and/or encoding to each of Client 910. Video Source 930 is optionally configured to provide 3-D video.

I/O Device 945 is configured for Video Server System 920 to send and/or receive information such as video, commands, requests for information, a game state, gaze information, device motion, device location, user motion, client identities, player identities, game commands, security information, audio, and/or the like. I/O Device 945 typically includes communication hardware such as a network card or modem. I/O Device 945 is configured to communicate with Game Server 925, Network 915, and/or Clients 910.

Processor 950 is configured to execute logic, e.g. software, included within the various components of Video Server System 920 discussed herein. For example, Processor 950 may be programmed with software instructions in order to perform the functions of Video Source 930, Game Server 925, and/or a Client Qualifier 960. Video Server System 920 optionally includes more than one instance of Processor 950. Processor 950 may also be programmed with software instructions in order to execute commands received by Video Server System 920, or to coordinate the operation of the various elements of Game System 900 discussed herein. Processor 950 may include one or more hardware device. Processor 950 is an electronic processor.

Storage 955 includes non-transitory analog and/or digital storage devices. For example, Storage 955 may include an analog storage device configured to store video frames. Storage 955 may include a computer readable digital storage, e.g. a hard drive, an optical drive, or solid state storage. Storage 915 is configured (e.g. by way of an appropriate data structure or file system) to store video frames, artificial frames, a video stream including both video frames and artificial frames, audio frame, an audio stream, and/or the like. Storage 955 is optionally distributed among a plurality of devices. In some embodiments, Storage 955 is configured to store the software components of Video Source 930 discussed elsewhere herein. These components may be stored in a format ready to be provisioned when needed.

Video Server System 920 optionally further comprises Client Qualifier 960. Client Qualifier 960 is configured for remotely determining the capabilities of a client, such as Clients 910A or 910B. These capabilities can include both the capabilities of Client 910A itself as well as the capabilities of one or more communication channels between Client 910A and Video Server System 920. For example, Client Qualifier 960 may be configured to test a communication channel through Network 915.

Client Qualifier 960 can determine (e.g., discover) the capabilities of Client 910A manually or automatically. Manual determination includes communicating with a user of Client 910A and asking the user to provide capabilities. For example, in some embodiments, Client Qualifier 960 is configured to display images, text, and/or the like within a browser of Client 910A. In one embodiment, Client 910A is an HMD that includes a browser. In another embodiment, client 910A is a game console having a browser, which may be displayed on the HMD. The displayed objects request that the user enter information such as operating system, processor, video decoder type, type of network connection, display resolution, etc. of Client 910A. The information entered by the user is communicated back to Client Qualifier 960.

Automatic determination may occur, for example, by execution of an agent on Client 910A and/or by sending test video to Client 910A. The agent may comprise computing instructions, such as java script, embedded in a web page or installed as an add-on. The agent is optionally provided by Client Qualifier 960. In various embodiments, the agent can find out processing power of Client 910A, decoding and display capabilities of Client 910A, lag time reliability and bandwidth of communication channels between Client 910A and Video Server System 920, a display type of Client 910A, firewalls present on Client 910A, hardware of Client 910A, software executing on Client 910A, registry entries within Client 910A, and/or the like.

Client Qualifier 960 includes hardware, firmware, and/or software stored on a computer readable medium. Client Qualifier 960 is optionally disposed on a computing device separate from one or more other elements of Video Server System 920. For example, in some embodiments, Client Qualifier 960 is configured to determine the characteristics of communication channels between Clients 910 and more than one instance of Video Server System 920. In these embodiments the information discovered by Client Qualifier can be used to determine which instance of Video Server System 920 is best suited for delivery of streaming video to one of Clients 910.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
executing, by a cloud gaming machine, a session of a cloud video game, the session configured to generate gameplay video;
streaming the gameplay video from the cloud gaming machine over a network to a primary user device, the primary user device configured to render the gameplay video to a primary display;
wherein the primary user device is configured to stream the gameplay video over a peer-to-peer network to one or more secondary user devices, each of said secondary user devices being configured to render the gameplay video, respectively, to one or more secondary displays;
receiving, over the network from the primary user device by the cloud gaming machine, primary inputs, that are generated from interactive gameplay associated with the primary user device;
receiving, over the network from the one or more secondary devices by the cloud gaming machine, secondary inputs, that are generated from interactive gameplay associated with the one or more secondary user devices;
processing, by the cloud gaming machine, the primary inputs and the secondary inputs to generate aggregated inputs;
wherein executing the session of the cloud video game includes applying the aggregated inputs to update a game state of the cloud video game that is processed to generate the gameplay video.

2. The method of claim 1, wherein the method enables substantially real-time interactive gameplay of the session of the cloud video game simultaneously through the primary user device and the one or more secondary user devices.

3. The method of claim 1, wherein the cloud gaming machine receives the secondary inputs directly from the one or more secondary user devices.

4. The method of claim 1, wherein the session of the cloud video game is defined as a single player session of the cloud video game.

5. The method of claim 1, wherein the cloud gaming machine is configured to instantiate a socket through which the secondary inputs are received from the one or more secondary user device.

6. The method of claim 1, wherein at least one of the secondary user devices is configured to execute a browser application that renders the gameplay video that is received over the peer-to-peer network.

7. The method of claim 1, wherein streaming the gameplay video over the peer-to-peer network to the one or more secondary user devices includes accessing a WebRTC application programming interface (API) to enable instantiation of the peer-to-peer network.

8. The method of claim 1, wherein processing the primary inputs and the secondary inputs to generate the aggregated inputs includes combining the primary inputs and the secondary inputs into a single input stream.

9. The method of claim 1, wherein processing the primary inputs and the secondary inputs to generate the aggregated inputs includes determining popular inputs based on the primary inputs and the secondary inputs.

10. The method of claim 1, wherein processing the primary inputs and the secondary inputs to generate the aggregated inputs includes determining, for a given input type and a current time interval, a single input command based on ones of the primary inputs and the secondary inputs that are of the given input type and which occur during the current time interval.

11. A method, comprising:
  executing, by a cloud gaming machine, a session of a cloud video game, the session configured to generate gameplay video;
  streaming the gameplay video from the cloud gaming machine over a network to a primary user device, the primary user device configured to render the gameplay video to a primary display;
  wherein the primary user device is configured to stream the gameplay video over a peer-to-peer network to one or more secondary user devices, each of said secondary user devices being configured to render the gameplay video, respectively, to one or more secondary displays;
  receiving, over the network from the primary user device by an aggregation server, primary inputs, that are generated from interactive gameplay associated with the primary user device;
  receiving, over the network from the one or more secondary devices by the aggregation service, secondary inputs, that are generated from interactive gameplay associated with the one or more secondary user devices;
  processing, by the aggregation server, the primary inputs and the secondary inputs to generate aggregated inputs;
  receiving, by the cloud gaming machine, the aggregated inputs from the aggregation server;
  wherein executing the session of the cloud video game includes applying the aggregated inputs to update a game state of the cloud video game that is processed to generate the gameplay video.

12. The method of claim 11, wherein the method enables substantially real-time interactive gameplay of the session of the cloud video game simultaneously through the primary user device and the one or more secondary user devices.

13. The method of claim 11, wherein the aggregation server receives the secondary inputs directly from the one or more secondary user devices.

14. The method of claim 11, wherein the session of the cloud video game is defined as a single player session of the cloud video game.

15. The method of claim 11, wherein the aggregation server is configured to instantiate a socket through which the secondary inputs are received from the one or more secondary user device.

16. The method of claim 11, wherein at least one of the secondary user devices is configured to execute a browser application that renders the gameplay video that is received over the peer-to-peer network.

17. The method of claim 11, wherein streaming the gameplay video over the peer-to-peer network to the one or more secondary user devices includes accessing a WebRTC application programming interface (API) to enable instantiation of the peer-to-peer network.

18. The method of claim 11, wherein processing the primary inputs and the secondary inputs to generate the aggregated inputs includes combining the primary inputs and the secondary inputs into a single input stream.

19. The method of claim 11, wherein processing the primary inputs and the secondary inputs to generate the aggregated inputs includes determining popular inputs based on the primary inputs and the secondary inputs.

20. The method of claim 11, wherein processing the primary inputs and the secondary inputs to generate the aggregated inputs includes determining, for a given input type and a current time interval, a single input command based on ones of the primary inputs and the secondary inputs that are of the given input type and which occur during the current time interval.

* * * * *